US012665484B2

(12) United States Patent
Slot et al.

(10) Patent No.: US 12,665,484 B2
(45) Date of Patent: Jun. 23, 2026

(54) POWER SUPPLY FOR POWERING A LOAD, METHOD FOR POWERING THE LOAD

(71) Applicant: eldoLAB Holding B.V., Son en Breugel (NL)

(72) Inventors: Machiel Slot, Ed Son en Breugel (NL); Franciscus Bernardus Marie Van Horck, Ed Son en Breugel (NL)

(73) Assignee: eldoLAB Holding B.V., Son en Breugel (NL)

( * ) Notice: Subject to any disclaimer, the term of this patent is extended or adjusted under 35 U.S.C. 154(b) by 26 days.

(21) Appl. No.: 18/871,972

(22) PCT Filed: Jun. 8, 2023

(86) PCT No.: PCT/EP2023/065324
§ 371 (c)(1),
(2) Date: Dec. 5, 2024

(87) PCT Pub. No.: WO2023/237646
PCT Pub. Date: Dec. 14, 2023

(65) Prior Publication Data
US 2025/0357840 A1 Nov. 20, 2025

(30) Foreign Application Priority Data

Jun. 9, 2022 (NL) ..................................... 2032105

(51) Int. Cl.
*H02M 1/00* (2007.01)
*H02M 1/42* (2007.01)
(Continued)

(52) U.S. Cl.
CPC ....... *H02M 1/0009* (2021.05); *H02M 1/0054* (2021.05); *H02M 1/4208* (2013.01);
(Continued)

(58) Field of Classification Search
CPC ............. H02M 1/0009; H02M 1/0054; H02M 1/4208; H02M 1/44; H02M 3/01;
(Continued)

(56) References Cited

U.S. PATENT DOCUMENTS

| 10,491,107 B2 * | 11/2019 | Poon ......................... H03K 7/08 |
| 10,680,510 B2 * | 6/2020 | Elferich ................... H02M 3/01 |

(Continued)

FOREIGN PATENT DOCUMENTS

| DE | 102016218552 A1 * | 3/2018 | ............. H05B 45/14 |
| EP | 3307022 A1 | 4/2018 | |
| WO | WO-2022069602 A1 * | 4/2022 | ........ H02M 3/33523 |

OTHER PUBLICATIONS

Machine Translation of DE-1020162218552-A1. (Year: 2016).*
(Continued)

*Primary Examiner* — Alexander H Taningco
*Assistant Examiner* — Pedro C Fernandez
(74) *Attorney, Agent, or Firm* — Sikand IP Law PLLC

(57) ABSTRACT

Power supply for powering a load, the power supply comprising an input terminal configured to be connected to an external power supply having a mains voltage, an output terminal configured to be connected to the load, a power converter configured to convert a supply power, received from the external power supply, to a load power for powering the load, a measurement circuit configured to provide a signal representative of the mains voltage, a control unit configured to determine a voltage and a current on a load side of the power converter, and receive the signal from the measurement circuit and to determine the mains voltage based on the signal, and determine the load power supplied on the load side of the power converter, determine a loss (Continued)

power representing the power loss from the external power supply to the load side of the power converter, and determine the supply power.

45 Claims, 8 Drawing Sheets

(51) Int. Cl.

| | |
|---|---|
| *H02M 1/44* | (2007.01) |
| *H02M 3/00* | (2006.01) |
| *H02M 3/335* | (2006.01) |
| *H05B 45/355* | (2020.01) |
| *H05B 45/36* | (2020.01) |
| *H05B 45/385* | (2020.01) |

(52) U.S. Cl.
CPC ............... *H02M 1/44* (2013.01); *H02M 3/01* (2021.05); *H02M 3/33569* (2013.01); *H05B 45/355* (2020.01); *H05B 45/36* (2020.01); *H05B 45/385* (2020.01)

(58) Field of Classification Search
CPC . H02M 3/33569; H05B 45/355; H05B 45/36; H05B 45/37–385
See application file for complete search history.

(56) References Cited

U.S. PATENT DOCUMENTS

| | | | | |
|---|---|---|---|---|
| 2017/0207708 A1* | 7/2017 | Hari | .................. | H02M 3/33507 |
| 2021/0391726 A1* | 12/2021 | Avestruz | ................. | H02J 3/381 |
| 2022/0302847 A1* | 9/2022 | Hsiang | ................... | H02M 1/44 |

OTHER PUBLICATIONS

International Search Report (PCT/ISA/210) with Written Opinion (PCT/ISA/237) mailed Aug. 1, 2023, by the European Patent Office as the International Searching Authority for International Application No. PCT/EP2023/065324. (8 pages).

* cited by examiner

500

600

POWER SUPPLY FOR POWERING A LOAD, METHOD FOR POWERING THE LOAD

CROSS REFERENCE TO RELATED APPLICATIONS

This application is a U.S. National Phase Application of International Application No. PCT/EP2023/065324 filed on Jun. 8, 2023, titled "POWER SUPPLY FOR POWERING A LOAD, METHOD FOR POWERING THE LOAD", the entirety of which is incorporated by reference herein. International Application No. PCT/EP2023/065324 claims priority to Patent Application No. NL2032105 filed on Jun. 9, 2022, the entirety of which is incorporated by reference herein.

BACKGROUND

The invention relates to a power supply for powering a load. The invention further relates to a method for powering the load.

A power supply is a device used to power a load. The load is for example an LED fixture comprising at least one LED or LED group. In general, an LED based illuminating application comprises a plurality of LEDs and a power supply for powering the LEDs by providing current through the LEDs. Such a power supply in general comprises a power converter such as a switched mode power supply (e.g. Buck or Boost converter) and a control unit for controlling the power converter. To supply power, the power supply is connected to a mains supply.

For example, a DC power supply is derived from the mains supply by means of an AC/DC converter. Such an AC (alternating current)/DC (direct current) converter can be arranged to convert an alternating voltage or current source (or more general, a power source) to a substantially direct voltage or current source (or more general, a power source). AC/DC converters are widely applied to convert an AC power source such as a mains connection (e.g. 230 V, 50 Hz) to a DC power source. The output of said DC power source may then be applied to power the load or may be applied to power a further power source, such as the power converter.

In general, there are different types of mains connections which are commonly applied. To determine the exact power supplied by the used mains connection, one could measure the voltage and current right after the output of the mains connection. However, in practice this is not straightforward to achieve, because the values of the respective voltage and current are relatively high to measure. Additionally, it is complicated to determine the power when an AC mains connection is applied compared to the DC situation.

Therefore, there is a need to determine in a more practical way the power supplied by the used mains connection.

SUMMARY OF THE INVENTION

It is an objective of the invention to provide a power supply for powering a load that is less affected by the disadvantage mentioned above, or to provide at least an alternative power supply.

The objective of the invention is achieved by a power supply for powering a load, the power supply comprising:
an input terminal configured to be connected to an external power supply having a mains voltage,
an output terminal configured to be connected to the load, a power converter configured to convert a supply power, received from the external power supply, to a load power,
a measurement circuit configured to provide a signal representative of the mains voltage,
a control unit configured to
determine a voltage and a current on a load side of the power converter, and
receive the signal from the measurement circuit and to determine the mains voltage based on the signal, and
determine the load power supplied on the load side of the power converter, based on the determined voltage and current on the load side of the power converter, and
determine a loss power representing the power loss from the external power supply to the load side of the power converter, based on a loss model as a function of the determined voltage and current on the load side of the power converter and the determined mains voltage, and
determine the supply power, received from the external power supply, based on the determined load power and the determined loss power.

The invention thus relates to a power supply for powering a load. The load is for example an LED fixture comprising at least one LED or LED group. The power supply comprises an input terminal. The input terminal is configured to be connected to an external power supply having a mains voltage. The input terminal is for example a plug or switch-plug. The external power supply is e.g. a mains supply configured to supply a mains voltage, for example 220 V at 50 Hz.

The power supply further comprises an output terminal configured to be connected to the load. When the external power supply is connected to the input terminal and the load is connected to the output terminal, the external power supply powers the load.

The power supply further comprises a power converter configured to convert a supply power, received from the external power supply, to a load power, e.g. for powering the load. The power converter can be a switched mode power converter. Such a switched mode power converter may e.g. comprise an inductance, an unidirectional element such as a diode and a switching element, e.g. a FET or a MOSFET. The switching of the switching element can e.g. be controlled by a controller or control unit. It is further acknowledged that other types of power converters such as boost, buck-boost, Ćuk, SEPIC or other, either synchronous or non-synchronous may advantageously be applied in combination with the present invention.

The power supply further comprises a measurement circuit configured to provide a signal representative of the mains voltage or mains signal related characteristics. As an example, the measurement circuit performs current and/or voltage measurements, e.g. DC measurements, to derive the signal representative of the mains voltage. The mains voltage is for example 120 V at 60 Hz or 277 V at 60 Hz. A signal representative of the mains voltage may e.g. comprise a signal value representing the mains supply voltage or may represent another characteristic of the mains supply voltage, e.g. a frequency of the mains supply.

In an embodiment, the measurement circuit may also determine other characteristics of the mains power or mains supply power. In an embodiment, the measurement circuit can e.g. be configured to determine a quality characteristic of the mains supply or mains power supply. Such quality characteristic can e.g. be an harmonic content of the mains supply voltage or a variation over time of the mains supply voltage. Such characteristic can e.g. be logged and reported by the power supply so as to gather information about potentially damaging events for the power supply. As another examiner of a characteristic which can be determined by the measurement circuit, a phase-cut dimming as applied to the mains supply voltage can be detected and determined by the measurement circuit.

The power supply further comprises a control unit. The control unit is configured to determine a voltage and a current on a load side of the power converter. The load side of the power converter is for example an output terminal of the power converter connectable to the load. The control unit is configured to receive the signal from the measurement circuit, e.g. via a processing unit. The measurement circuit is for example integrated in the control unit. Based on the received signal, the control unit is able to determine the mains voltage. Alternatively, the control unit directly determines the current and/or voltage, for example at the load side of the power converter, instead of the measurement circuit.

The control unit is further configured to determine the load power supplied on the load side of the power converter, based on the determined voltage and current on the load side of the power converter. By multiplying the determined voltage with the determined current, the control unit determines the load power.

The control unit is further configured to determine a loss power representing the power loss from the external power supply to the load side of the power converter, based on a loss model as a function of the determined voltage and current on the load side of the power converter and the determined mains voltage. The loss model takes into account the losses upstream of the load side of the power converter based on applied components and datasheets of the components. The loss model is for example based on an empirical model, for example a regression model. The empirical approach is to measure losses for a number of load conditions and for a number of power supplies. The empirical model is for example the following regression model:

$$P_{loss}(V_{mains}, V, I) = c_0 + c_1 \cdot V \cdot I$$

wherein:
  $P_{loss}$=the loss power representing the power loss from the external supply to the load side of the power converter, expressed in watts
  $V_{mains}$=the mains voltage determined by the measurement circuit
  V=voltage determined by the measurement circuit
  I=current determined by the measurement circuit
  $c_0$, $c_1$=model parameters
  The model parameters $c_0$ and $c_1$ are estimated based on the determined mains voltage. A causal relationship is inferred between these variables and the determined mains voltage. These model parameters are modelled by using observational data, for example by performing a plurality of experiments at different mains voltages and measure the current and/or voltage.

By using easy to measure quantities, as the current and voltage, the invention provides an efficient manner to determine the loss power.

The control unit is further configured to determine the supply power, received from the external power supply, based on the determined load power and the determined loss power. The supply power is the summation of the determined load power and the determined loss power. This way, the power supply according to the invention provides a more practical manner to determine the supply power supplied by the external power supply without losing accuracy.

In an embodiment, the power converter comprises an isolation transformer, the isolation transformer having a primary circuit connected to the input terminal and a secondary circuit connected to the output terminal, the secondary circuit being electrically isolated from the primary circuit and magnetically coupled to the primary circuit. The power converter is for example a flyback converter equipped with an isolation transformer. The isolation transformer is for example built of two separated parallel magnetic coils. The isolation transformer provides electrical isolation between a primary circuit for example connected to the external power supply and a second circuit for example connected to the load. A current flowing through the primary circuit does not interfere with a current flowing through the secondary circuit. The isolation transformer magnetically couples the primary circuit to the secondary circuit. As a result, the current flowing through the primary circuit is magnetically transferred to the secondary circuit.

In an embodiment, the measurement circuit is configured to measure the voltage and current on the secondary circuit of the isolation transformer. For example, the isolation transformer is incorporated in a resonant converter. The values of the voltage and the current on the secondary circuit of the isolation transformer are for example lower compared to the primary circuit. This way, it is more easier to measure the voltage and the current.

In another embodiment, the measurement circuit is configured to measure the voltage and current on the primary circuit of the isolation transformer. When measuring the voltage and current on the primary circuit of the isolation, the losses through the power supply which need to be taken into account when determining the power loss are minimised.

In an embodiment, the measurement circuit is configured to generate the signal representative of the mains voltage on the load side of the power converter. For example, the signal is based on a conduction period of current flowing through the secondary circuit when the power converter is switched from a first state to a second state and on a number of pulses during a measurement cycle. As an example, suppose that a primary current flows through the primary circuit. The isolation transformer transfers the electrical energy from the primary circuit to the secondary circuit, wherein it induces the flowing of a secondary current through the secondary circuit. The secondary circuit comprises a diode. The diode is also referred as the secondary flyback diode. When the power converter is switched, for example by a MOSFET, from a first state, e.g. the power converter is "ON", to a second state, e.g. the power converter is "OFF", the primary current flowing through the primary circuit decreases instantaneously towards zero. As a result the secondary current flowing through the secondary circuit gradually decreases towards zero. The period the secondary current flows through the secondary circuit after the power converter is switched from the first state to the second state is referred as the conduction period. This approach is repeated during a measurement window or measurement cycle, e.g. 433 μs. During this measurement window the condition period is determined multiple times. Additionally, in this measurement window the number of pulses are counted. With the measured conduction period and the number of pulses during the measurement window, a correlation is determined, e.g. empirically, with respect to the supplied mains voltage. With this correlation, the supplied mains voltage can be deduced as a function of the measured conduction period and the number of pules during the measurement window. For example, the determined conduction periods during the measurement window are added up. The summation of the conduction time is done for a plurality of measurement windows. The summation of the conduction time of each measurement window can be plotted in a graph. A distinction between different mains voltages, e.g. 120 Vac or 277 Vac, can be made if the summation of the conduction time is below or above a certain threshold.

In another embodiment, the measurement circuit is configured to generate the signal representative of the mains voltage on an input side of the power converter. For example, a voltage is measured on the input side of the power converter. The voltage is for example measured by a measurement device. The measurement device is for example part of the measurement circuit. Preferably, the measurement device is an opto-coupler. The measurement device has a specific, known constant value. The constant value is a fixed ratio between the measured quantity at an input of the measurement device and a transmitted value at an output of the measurement device. For example, when the measurement device measures the voltage on the input side of the power converter, the measured voltage is transferred via the measurement device to the output, e.g. by transmitting a signal. By transferring the measured voltage, the measured voltage is multiplied with the constant value attributed to the measurement device to obtain an estimation of the mains voltage. The measurement device is for example able to transfer the measured voltage from the primary circuit to the secondary circuit of the isolation transformer. During this transfer, the signal is electrically isolated by the measurement device.

In an embodiment, the external power supply is an AC power supply. The AC power supply for example operates at 277 V, 60 Hz. The power supply further comprises a rectifier for rectifying the AC power supply. The rectifier converts the AC current to direct current (DC). DC current is easier to measure compared to AC current.

Additionally, the power converter comprises an electromagnetic interference filter (EMI) filter arranged downstream of the rectifier. The EMI filter provides electromagnetic noise suppression for the power supply.

Alternatively, the external power supply is a DC power supply.

In an embodiment, the power converter comprises a flyback converter or a resonant converter. In case the power converter comprises the resonant converter, the power converter may additionally comprise a PFC (power factor correction) boost circuit arranged upstream of the resonant converter. The PFC aims at shaping the input current from the external power supply to be as sinusoidal as possible, in order to reduce harmonic distortion and its associated losses. Preferably, the power factor is as close as possible to 1.0.

Additionally, the power converter comprises a buck or boost converter arranged downstream of the flyback or resonant converter. The buck or boost converter is for example applied to adjust the duty cycle of the power supplied to the load, e.g. the duty cycle can be decreased from 100% to 50% to dim an LED fixture.

In an embodiment, the measurement circuit is configured to determine an internal current associated with the resonant converter. The resonant converter comprises the isolation transformer having the primary circuit electrically separated from the secondary circuit. The internal current associated with the resonant converter flows through the primary circuit. The internal current associated with the resonant converter enables the regulation of the load. The internal current associated with the resonant converter together with the determined voltage are used to determine the loss in the primary circuit.

In an embodiment, the measurement circuit is configured to determine an internal current associated with the PFC-boost circuit. The internal current associated with the PFC-boost circuit together with the determined voltage are used to determine the mains voltage from the external power supply.

According to a further aspect of the invention, a power supply is provided for powering a load, the power supply comprising an input terminal configured to be connected to an external power supply having a mains voltage, an output terminal configured to be connected to the load, a power converter configured to convert a supply power, received from the external power supply, to a load power, the power converter having an isolation transformer having a primary circuit connected to the input terminal and a secondary circuit connected to the output terminal, the secondary circuit being electrically isolated from the primary circuit and magnetically coupled to the primary circuit, a measurement circuit configured to provide a signal representative of an internal current associated with the power converter, a control unit configured to determine one or more electrical characteristics on the primary circuit of the isolation transformer, and receive the signal from the measurement circuit, determine the load power supplied on the primary circuit of the isolation transformer, based on the determined one or more electrical characteristics and the internal current associated with the power converter, and determine a loss power representing the power loss from the external power supply to a mains side of the power converter, based on a loss model as a function of the determined one or more electrical characteristics and the internal current associated with the power converter, and determine the supply power, received from the external power supply, based on the determined load power and the determined loss power.

The further aspect of the invention thus relates to a power supply for powering a load. The load is for example an LED fixture comprising at least one LED or LED group. The power supply comprises an input terminal. The input terminal is configured to be connected to an external power supply having a mains voltage. The input terminal is for example a plug or switch-plug. The external power supply is e.g. a mains supply configured to supply a mains voltage, for example 220 V at 50 Hz.

The power supply further comprises an output terminal configured to be connected to the load. When the external power supply is connected to the input terminal and the load is connected to the output terminal, the external power supply powers the load.

The power supply further comprises a power converter configured to convert a supply power, received from the external power supply, to a load power, e.g. for powering the load. The power converter can be a switched mode power converter. Such a switched mode power converter may e.g. comprise an inductance, an unidirectional element such as a diode and a switching element, e.g. a FET or a MOSFET. The switching of the switching element can e.g. be controlled by a controller or control unit. It is further acknowledged that other types of power converters such as boost, buck-boost, Cuk, SEPIC or other, either synchronous or non-synchronous may advantageously be applied in combination with the present invention.

The power converter has an isolation transformer having a primary circuit connected to the input terminal and a secondary circuit connected to the output terminal, the secondary circuit being electrically isolated from the primary circuit and magnetically coupled to the primary circuit. So, when a current is flowing through the primary circuit, the transformer magnetically transfers the current to the secondary circuit.

The power supply further comprises a measurement circuit configured to provide a signal representative of an internal current associated with the power converter. As an example, the measurement circuit measures the current flowing through the primary circuit.

The power supply further comprises a control unit. The control unit is configured to determine one or more electrical characteristics on the primary circuit of the isolation transformer. The one or more electrical characteristics are for example a voltage and/or a current. The control unit is configured to receive the signal from the measurement circuit, e.g. via a processing unit. The measurement circuit is for example integrated in the control unit.

The control unit is further configured to determine the load power supplied on primary circuit of the isolation transformer, based on the determined one or more electrical characteristics and the received signal representative of the internal current associated with the power converter. For example, the one or more electrical characteristics are a voltage and a current measured on the primary circuit of the isolation transformer, wherein the control unit determined the load power by multiplying the determined voltage with the determined current. Alternatively, the load power is based on a measured voltage on the primary circuit of the isolation transformer and the determined internal current associated with the power converter.

The control unit is further configured to determine a loss power representing the power loss from the external power supply to a mains side of the power converter, based on a loss model as a function of the determined one or more electrical characteristics and the internal current associated with the power converter. The loss model takes into account the losses upstream of the mains side of the power converter based on applied components and datasheets of the components. The loss model is for example based on an empirical model, for example a regression model. The empirical approach is to measure losses for a number of load conditions and for a number of power supplies.

The control unit is further configured to determine the supply power, received from the external power supply, based on the determined load power and the determined loss power. The supply power is the summation of the determined load power and the determined loss power. This way, the power supply according to the invention provides a more practical manner to determine the supply power supplied by the external power supply without losing accuracy.

In an embodiment, the measurement circuit is configure to provide a further signal representative of the mains frequency or a quality characteristic of the external power supply to the control unit. The further signal may also e.g. be a signal representing a phase-cut dimming as applied to the mains voltage or external power supply.

In an embodiment, the control unit can be configure to determine a quality characteristic of the mains supply or external power supply, e.g. based on such a further signal as received from the measurement circuit. The harmonic content or variations over time of the mains voltage can e.g. be monitored, in order to detect life-time reducing properties on the mains signal, which can then be logged and reported.

In an embodiment, the control unit can be configure to determine, based on the further signal representing a phase-cut dimming level, a requested output power level for the power supply. In such embodiment, the power supply according to the invention can determine, based on the detected phase-cut dimming level, a desired output power and adjust an output power of the power converter of the power supply accordingly.

In an embodiment, the external power supply is an AC power supply. The AC power supply for example operates at 277 V, 60 Hz. The power supply further comprises a rectifier for rectifying the AC power supply. The rectifier converts the AC current to direct current (DC). DC current is easier to measure compared to AC current.

Additionally, the power converter comprises an electromagnetic interference filter (EMI) filter arranged downstream of the rectifier. The EMI filter provides electromagnetic noise suppression for the power supply.

Alternatively, the external power supply is a DC power supply.

In an embodiment, the power converter comprises a flyback converter or a resonant converter. In case the power converter comprises the resonant converter, the power converter may additionally comprise a PFC (power factor correction) boost circuit arranged upstream of the resonant converter. The PFC aims at shaping the input current from the external power supply to be as sinusoidal as possible, in order to reduce harmonic distortion and its associated losses. Preferably, the power factor is as high as possible.

Additionally, the power converter comprises a buck or boost converter arranged downstream of the flyback or resonant converter. The buck or boost converter is for example applied to adjust the duty cycle of the power supplied to the load, e.g. the duty cycle can be decreased from 100% to 50% to dim an LED fixture.

In an embodiment, the measurement circuit is configured to determine an internal current associated with the resonant converter. The resonant converter comprises the isolation transformer having the primary circuit electrically separated from the secondary circuit. The internal current associated with the resonant converter flows through the primary circuit. The internal current associated with the resonant converter enables the regulation of the load. The internal current associated with the resonant converter together with the determined voltage are used to determine the mains voltage from the external power supply.

In an embodiment, the measurement circuit is configured to determine an internal current associated with the PFC-boost circuit. The internal current associated with the PFC-boost circuit together with the determined voltage are used to determine the mains voltage from the external power supply.

The invention further pertains to a method for powering a load, the method comprising the steps of:
  connecting an input terminal to an external power supply having a mains voltage,
  connecting an output terminal to the load,
  converting a supply power, received from the external power supply, by a power converter to a load power, determining a voltage and a current on a load side of the power converter, providing a signal representative of the mains voltage, receiving the signal to determine the mains voltage, determining the load power supplied on the load side of the power converter, based on the determined voltage and current on the load side of the power converter, determining a loss power representing the power loss from the external power supply to the load side of the power converter, based on a loss model as a function of the determined voltage and current on the load side of the power converter and the determined mains voltage, and determining the supply power, received from the external power supply, based on the determined load power and the determined loss power.

In an embodiment, the method according to the invention further comprises the steps of:

connecting a primary circuit to the input terminal and connecting a secondary circuit to the output terminal, the secondary circuit being electrically isolated from the primary circuit and magnetically coupled to a primary circuit.

Optionally, in this embodiment, the step of determining the voltage and the current on the load side of the power converter comprises the further step of determining the voltage and the current on the secondary circuit.

Alternatively, the step of determining the voltage and the current on the load side of the power converter comprises the step of determining the voltage and the current on the primary circuit.

In an embodiment, the step of providing the signal comprises the step of providing the signal representative of the mains voltage on the load side of the power converter.

In an embodiment, the step of providing the signal comprises the measuring of a conduction period of current flowing through the secondary circuit when the power converter is switched form a first state to a second state.

In an embodiment, the step of providing the signal comprises the step of providing of the signal representative of the mains voltage on a mains side of the power converter.

In an embodiment, the method according to the invention further comprises the step of rectifying the external power supply.

In an embodiment, the method according the invention further comprises the step of determining an internal current associated with the power converter.

The invention further pertains to a method for powering a load, the method comprising the steps of:

connecting an input terminal to an external power supply having a mains voltage, connecting an output terminal to the load, converting a supply power, received from the external power supply, by a power converter to a load power, the power converter having a primary circuit connected to the input terminal and a secondary circuit connected to the output terminal, the secondary circuit being electrically isolated from the primary circuit and magnetically coupled to the primary circuit, determining one or more electrical characteristics on the primary circuit, providing a signal representative of an internal current associated with the power converter, receiving the signal, determining the load power supplied on the primary circuit, based on the determined one or more electrical characteristics and the internal current associated with the power converter, determining a loss power representing the power loss from the external power supply to a mains side of the power converter, based on a loss model as a function of the determined one or more electrical characteristics and the internal current associated with the power converter, and determining the supply power, received from the external power supply, based on the determined load power and the determined loss power.

In an embodiment, the method according to the invention further comprises the step of rectifying the external power supply.

In an embodiment, the method according to the invention further comprises the step of determining an internal current associated with the power converter.

BRIEF DESCRIPTION OF THE FIGURES

The invention will be described in more detail below with reference to the figures, in which in a non-limiting manner exemplary embodiments of the invention will be shown. The same reference numerals in different figures indicate the same characteristics in different figures.

In the figures.

DESCRIPTION

Figure 1A:
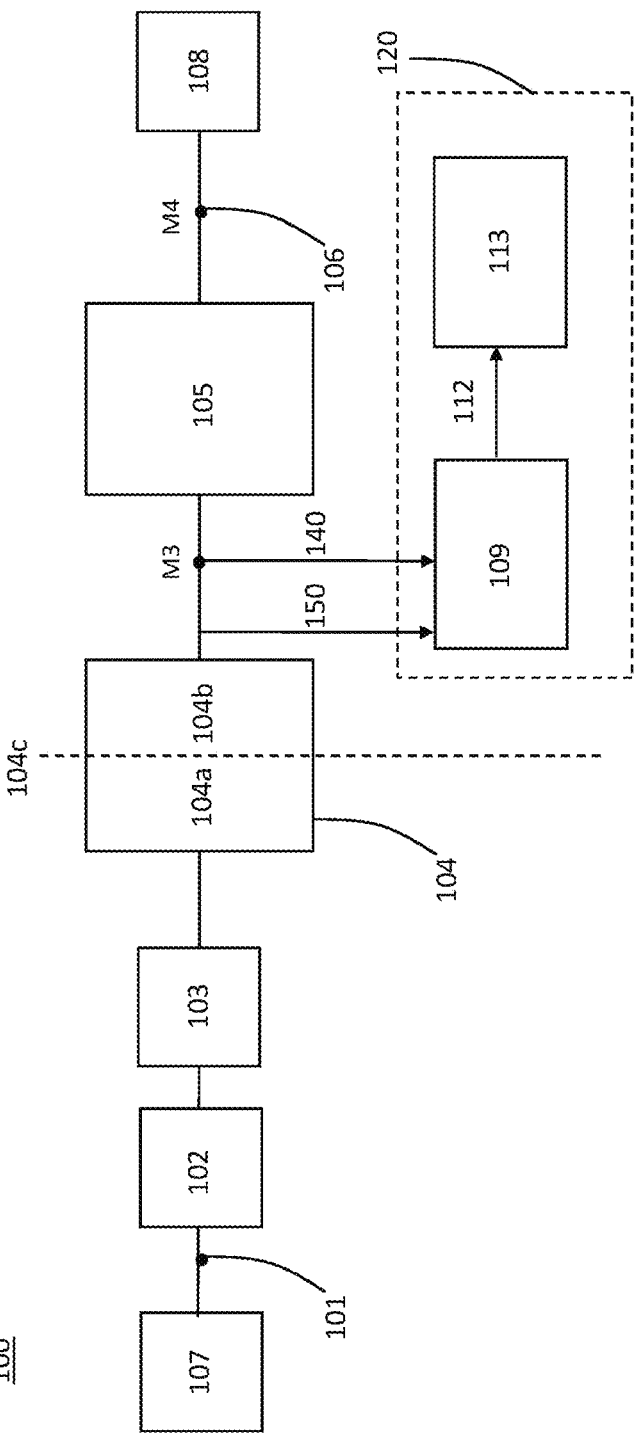
FIG. 1a: Schematically illustrates a first embodiment of a power supply according to the invention.

FIG. 1a schematically illustrates a first embodiment of a power supply according to the invention. In FIG. 1a, the power supply 100 comprises (from left to right) an input terminal 101, an EMI filter 102, a rectifier 103, a PFC flyback converter 104, a buck or boost converter 105 and an output terminal 106. The input terminal 101 is connected to an external power supply 107. The external power supply 107 is for example an AC power supply. In the embodiment as shown, the external power supply supplies an AC power to the EMI filter 103. The EMI filter 102 mitigates electromagnetic interference. The filtered AC power is provided to the rectifier 103. The rectifier 103 rectifies the AC power to DC power.

In the embodiment as shown, the power supply 100 further comprises the PFC flyback converter 104 for controlling a power factor of the power drawn from the external power supply. The PFC flyback converter provides an electrical isolation 104c. The electrical isolation 104c is configured to electrically separate a first circuit 104a, connected to the rectifier 103, from a second circuit 104*b*. The second circuit 104*b* is connected to the buck or boost converter 105.

Via output terminal 106, the buck or boost converter 105 is connected to a load 108, for example one or more LEDs or LED groups. The PFC flyback converter 104 and the buck or boost converter 105 combined can be considered as a power converter converting an input power from the external power supply 107 to a load power for powering the load 108. In the embodiment of FIG. 1*a*, the power supply is further equipped with a measurement circuit 109. The measurement circuit 109 is configured to measure one or more electrical characteristics of the power converter. In FIG. 1*a*, the measurement circuit 109 performs DC voltage and current measurements 140 at measurement location M3. Measurement location M3 is located at the load side of the flyback converter 104 and arranged between the second circuit 104*b* and the buck or boost converter 105.

Further, the measurement circuit 109 determines a switching behaviour 150 of the PFC flyback converter 104 at the load side of the PFC flyback converter 104, i.e. at the secondary circuit 104*b*. Based on the switching behaviour 150 of the PFC flyback converter 104, the measurement circuit 109 generates a signal 112 representative of the mains voltage of the external power supply 107. The signal 112 is for example derived from a conduction period of current flowing through the secondary circuit 104*b* when the PFC flyback converter 104 is switched, e.g. turned off, and a number of pulses during a measurement window. This can be illustrated with reference to FIG. 1*b*.

Figure 1B:
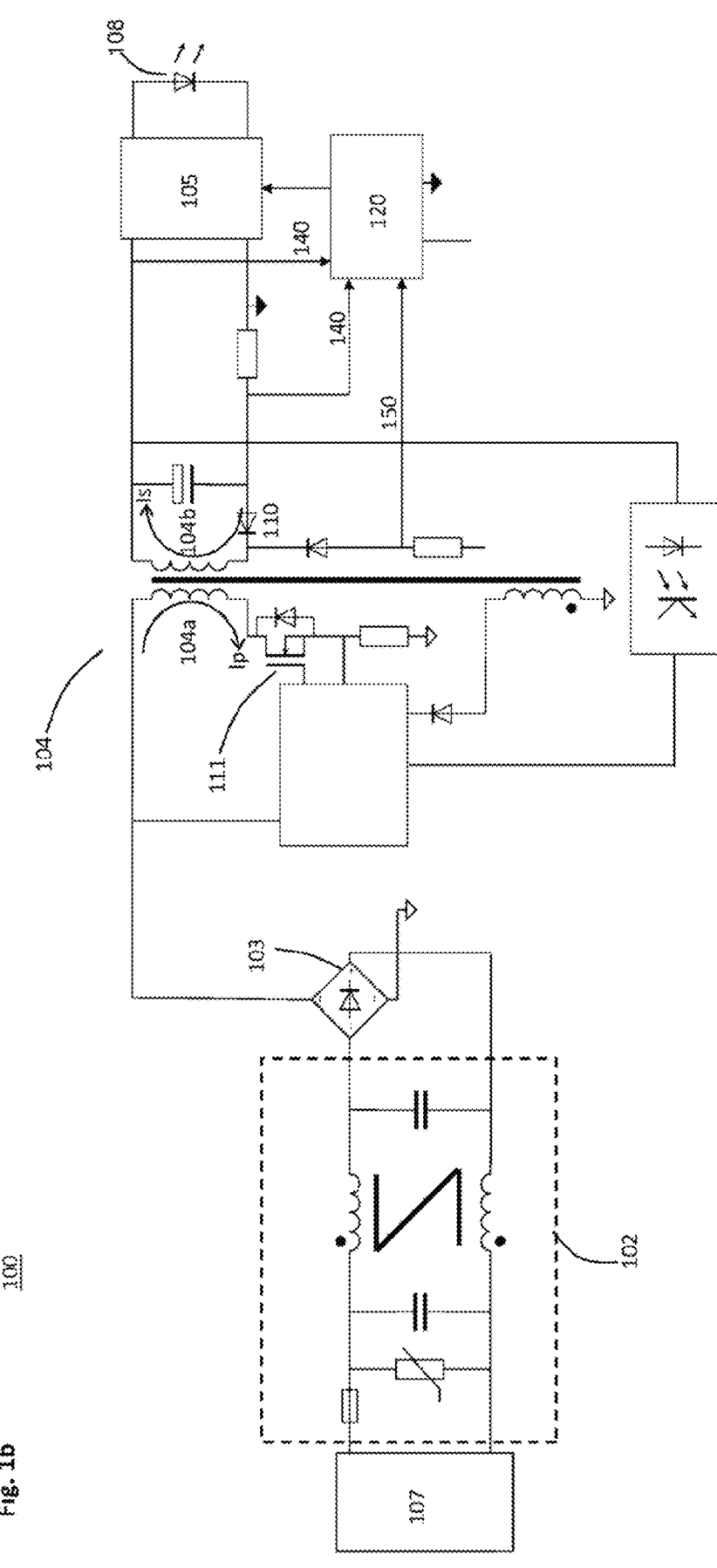
FIG. 1b: Schematically illustrates the electrical implementation of the first embodiment of power supply according to invention.

FIG. 1*b* schematically illustrates a possible electrical implementation of the first embodiment of the power supply 100 according to FIG. 1. The circuitry of the power converter 104 comprises the primary circuit 104*a* and the secondary circuit 104*b*. As an example, suppose that a primary current Ip flows through the primary circuit 104*a*. The isolation transformer of the PCF flyback converter 104 transfers the electrical energy from the primary circuit 104*a* to the secondary circuit 104*b*, wherein it induces the flowing of a secondary current Is through the secondary circuit 104*b*. The secondary circuit 104*b* comprises a diode 110. The diode 110 is also referred as the secondary flyback diode. The PFC flyback converter 104 is configured to be switched by a MOSFET 111 from a first state, e.g. the power converter is "ON", to a second state, e.g. the power converter is "OFF". By switching the power converter 104, the primary current Ip flowing through the primary circuit 104*a* decreases instantaneously towards zero. As a result the secondary current Is flowing through the secondary circuit 104*b* gradually decreases towards zero. The period during which the secondary current flows through the secondary circuit 104*b* after the power converter 104 is switched from the first state to the second state is referred as the conduction period. The conduction period is detected by the measurement circuit. This switching process is repeated during a measurement window, for example 433 µs. During this interval, the number of pulses are counted. Based on the conduction period and the number of pulses, the measurement circuit is configured to provide a signal representative of the mains voltage. The mains voltage is for example 120 V at 60 Hz or 277 V at 60 Hz.

Figure 1C:
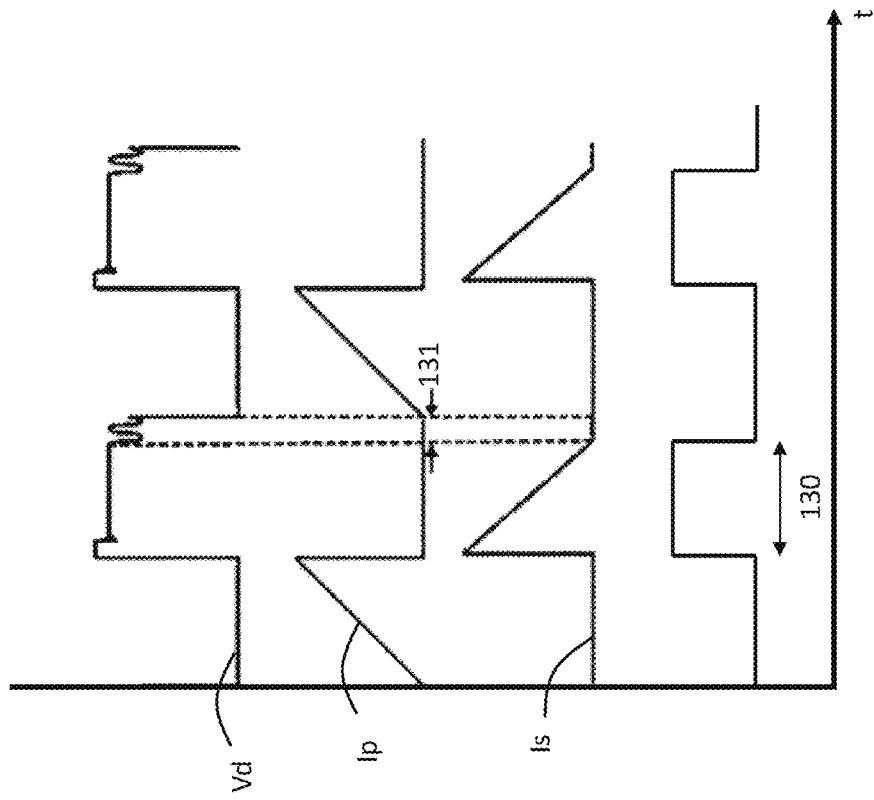
FIG. 1c: Schematically illustrates the concept of a conduction period of the secondary current.

FIG. 1*c* schematically illustrates the conduction period based on a power converter as depicted in FIG. 1*b*. The primary current Ip and the secondary current Is flowing through the primary circuit and the secondary circuit respectively, are shown as a function of time. The curve at the top of FIG. 1*c* corresponds to the voltage at the drain Vd of the MOSFET 111 of the power converter. When the voltage at the drain Vd is low, the MOSFET is switched "ON", and thus the power converter is supplying the primary current Ip, which is linearly increasing as a function of time. By switching the MOSFET to the "OFF" state at time t1, the primary current Ip flowing through the primary circuit decreases instantaneously towards zero. As a result the secondary current Is flowing through the secondary circuit. The secondary current Is gradually decreases towards zero. The period during which the secondary current Is is flowing through the secondary circuit after the power converter is switched from the first state to the second state is referred as the conduction period 130. After some time, the MOSFET is switched back to the first state, whereby the process is repeated. The time period between the moment that the secondary current is equal to zero and the moment when the MOSFET is switched, is referred as the idle period 131.

Referring back to FIG. 1*a*, the power supply 100 further comprises a control unit 120. The control unit 120 comprises the measurement circuit 109. Alternatively, the control unit 120 and the measurement circuit 109 are separate components. The control unit 120 further comprises a processing unit 113. The processing unit 113 is configured to receive the signal 112 from the measurement circuit 109. Via signal 112, the processing unit 113 additionally receives the determined voltage and current 140 at measurement point M3 from the measurement circuit 109. Based on the received signal 112, the control unit 120 is able to determine the mains voltage. Alternatively, the control unit 120 directly determines the voltage and the current 140 on the load side of the power converter 104. The control unit 120 controls the buck or boost converter 105 to provide a current or a voltage to the load 108, for example the control unit 120 controls a LED current for powering one or more LEDs or LED groups.

The control unit 120 is further configured to determine the load power supplied on the load side of the power converter, based on the determined voltage and current 140 on the load side of the PFC flyback converter 104. By multiplying the determined voltage with the determined current, the load power is obtained.

The control unit 120 is further configured to determine a loss power representing the power loss from the external power supply to the load, based on a loss model as a function of the determined voltage and current on the load side of the power converter and the determined mains voltage. The loss model takes into account the losses upstream of the load side of the power converter based on applied components and datasheets of the components. The loss model is for example based on an empirical model. The empirical approach is to measure losses for a number of load conditions and for a number of power supplies. The empirical model is for example a regression model. By using easy to measure quantities, as the current and voltage, the invention provides an efficient manner to determine the loss power.

The control unit 120 is further configured to determine the supply power, received from the external power supply 107, based on the determined load power and the determined loss power. The supply power is the summation of the determined load power and the determined loss power. This way, the power supply according to the invention provides a more practical manner to determine the supply power supplied by the external power supply without losing accuracy.

Figure 2:
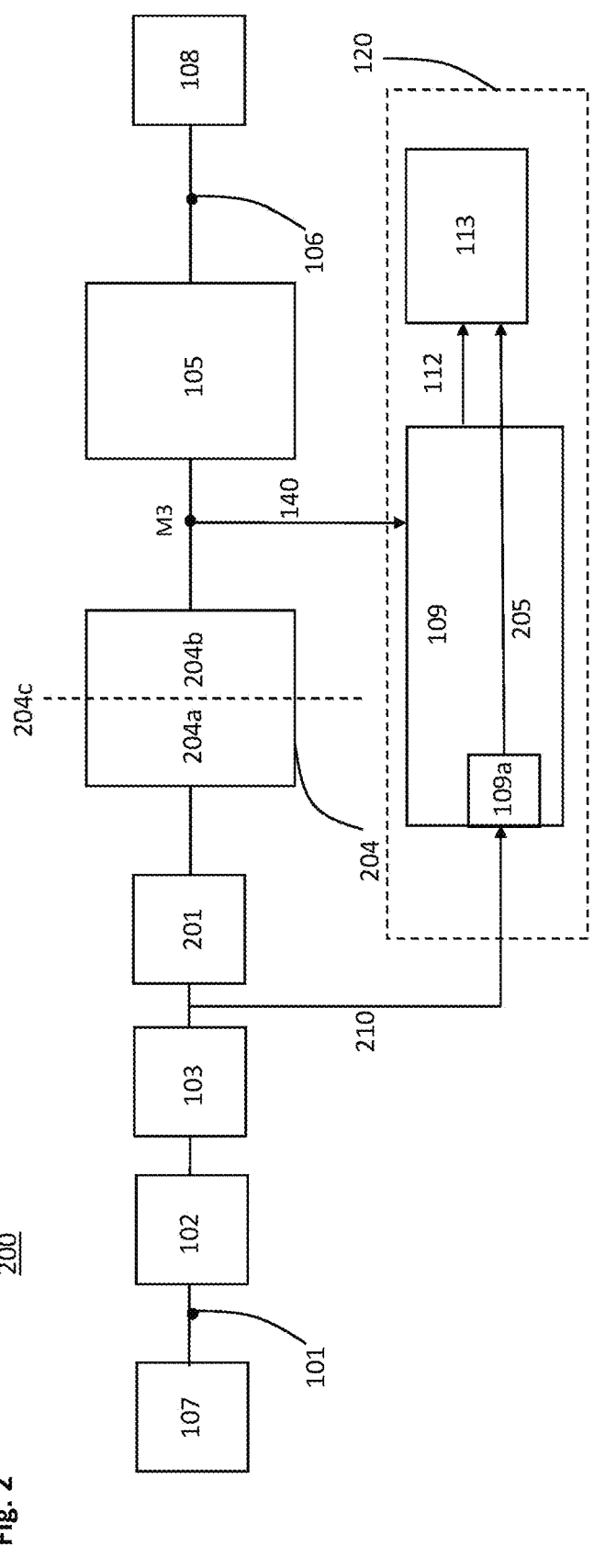
FIG. 2: Schematically illustrates a second embodiment of a power supply according to the invention.

FIG. 2 shows a second embodiment of a power supply for powering a load. The features of the power supply 200 corresponding with those of the power supply 100 shown in FIG. 1 are indicated with the same reference numerals in FIG. 2.

In FIG. 2, the power converter comprises a PFC boost circuit 201 and a resonant converter 204. The PFC boost circuit 201 is arranged upstream of the resonant converter 204. The PFC boost circuit 201 aims at shaping the input current from the external power supply 107 to be as sinusoidal as possible, in order to reduce harmonic distortion and its associated losses. Preferably, the power factor is as close as possible to 1.0.

The resonant converter 204 comprises an isolation transformer 204*c*. The isolation transformer 204*c* comprises a primary circuit 204*a* connected to the PFC boost circuit 201 and a secondary circuit 204*b* connected to the buck or boost converter 105. The secondary circuit 204*b* being electrically isolated from the primary circuit 204*a* and magnetically coupled to the primary circuit 204*a*.

The measurement circuit 109 measures a voltage 210 representative of the mains voltage on a mains side of the power converter 204. More particularly, the voltage 210 is measured between the rectifier 103 and the PFC boost circuit 201. The measured voltage 210 is thus extracted at the primary side 204*a* of the isolation transformer 204*c*. The voltage 210 is measured by a measurement device 109*a*. The measurement device 109*a* is part of the measurement circuit 109. Preferably, the measurement device 109*a* comprises an opto-coupler. The measurement device 109*a* has a specific, known constant value. The constant value is a fixed ratio between the measured quantity at an input of the measurement device 109*a* and a transmitted value at an output of the measurement device 109*a*. When the measurement device 109*a* measures the voltage 210 on the primary side of the power converter 204, the measured voltage 210 is transferred via the measurement device 109*a* to the secondary side of the power converter 204 by transmitting a signal 205 representative of the voltage on the primary side of the power converter. By transferring the measured voltage 210, the measured voltage 210 is multiplied with the constant value attributed to the measurement device 109*a* to obtain an estimation of the mains voltage. The constant value is for example $5.10^{-6}$. The measurement device 109*a* is able to transfer the measured voltage from the primary circuit 204*a* to the secondary circuit 204*b* of the isolation transformer. During this transfer, the signal 205 is electrically isolated by the measurement device 109*a*.

The measured voltage is multiplied with a constant value to obtain an estimation of the mains voltage. The measurement circuit 109 is further configured to generate the signal 112 representative of the mains voltage on an input side of the power converter 204, which signal 112 is received by the processing unit 113 of the control unit 120.

Figure 3:
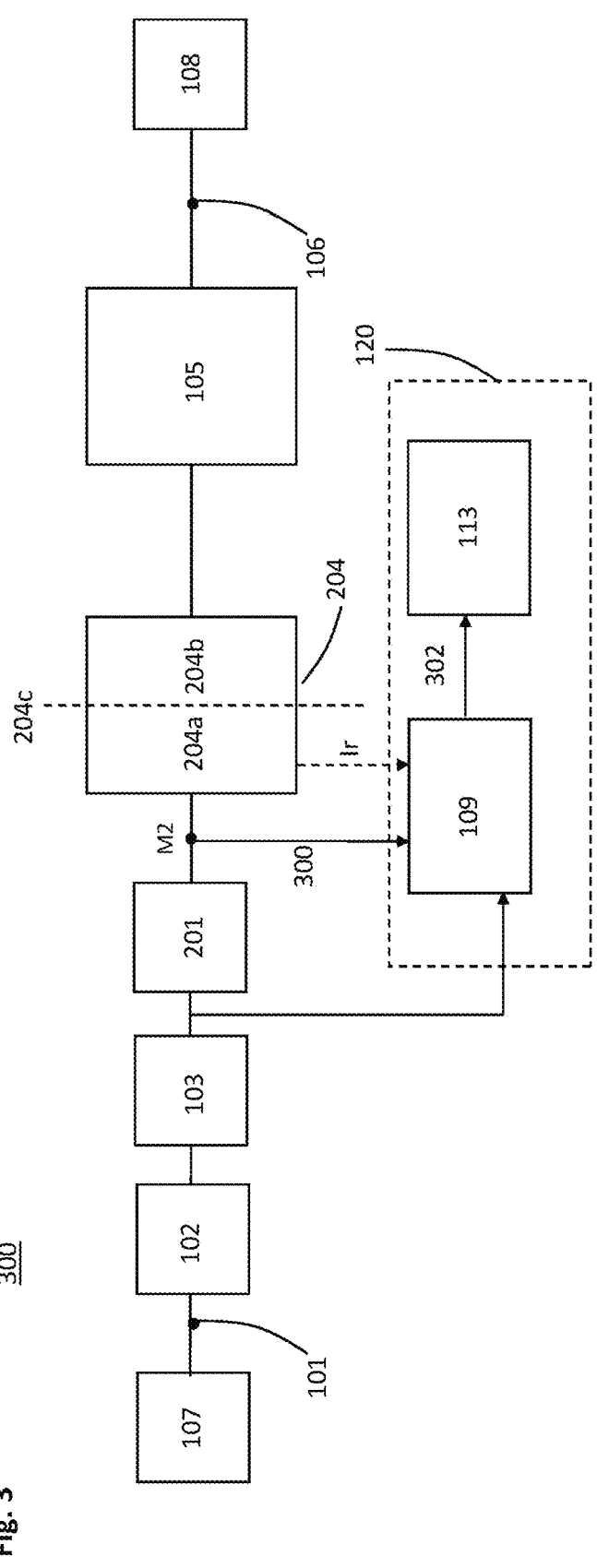
FIG. 3: Schematically illustrates a third embodiment of a power supply according to the invention.

FIG. 3 shows a third embodiment of a power supply for powering a load. The features of the power supply 300 corresponding with those of the power supply 100, 200 shown in FIGS. 1-2 are indicated with the same reference numerals in FIG. 3.

In FIG. 3, the control unit 120 is configured to determine one or more electrical characteristics 300 at measurement location M2. Measurement location M2 is located on the primary circuit 204*a* of the isolation transformer 204. The control unit 120 for example determines a voltage and/or a current at M2. The one or more electrical characteristics 300 are measured by the measurement circuit 109. Alternatively, the control unit 120 directly measures the one or more electrical characteristics 300.

Optionally, the measurement circuit 109 is configured to provide a signal 302 representative of an internal current Ir associated with the resonant converter 204. The internal current Ir associated with the resonant converter 204 flows through the primary circuit 204*a*. The internal current Ir associated with the resonant converter 204 enables the regulation of the load 108. The internal current Ir associated with the resonant converter 204 together with the determined one or more electrical characteristics 300, e.g. a voltage, are used to determine to determine the loss in the primary circuit 204*a*. The processing unit 113 is configured to receive the signal 302 from the measurement circuit 109.

Figure 4:
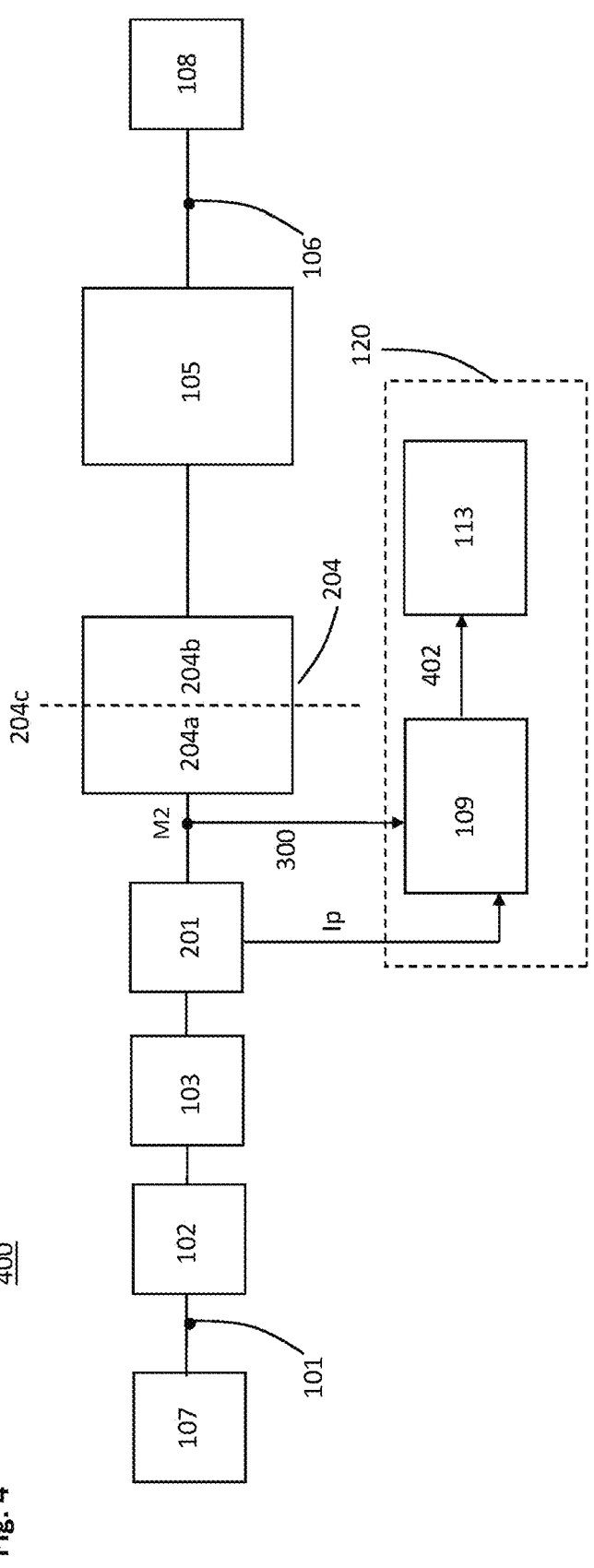
FIG. 4: Schematically illustrates a fourth embodiment of a power supply according to the invention.

FIG. 4 shows a fourth embodiment of a power supply for powering a load. The features of the power supply 400 corresponding with those of the power supply 100, 200, 300 shown in FIGS. 1-3 are indicated with the same reference numerals in FIG. 4.

In FIG. 4, the measurement circuit 109 determines an internal current Ip associated with the PFC-boost circuit 201. Further, the measurement circuit 109 determines a voltage on the primary circuit 204*a* of the isolation transformer 204.

The internal current Ip associated with the PFC-boost circuit 201 together with the determined voltage are used to determine the mains voltage from the external power supply 107.

The measurement circuit 109 is configured to provide a signal 402 representative of an internal current Ip associated with the PFC-boost circuit 201. The processing unit 113 is configured to receive the signal 402 from the measurement circuit 109.

Figure 5:
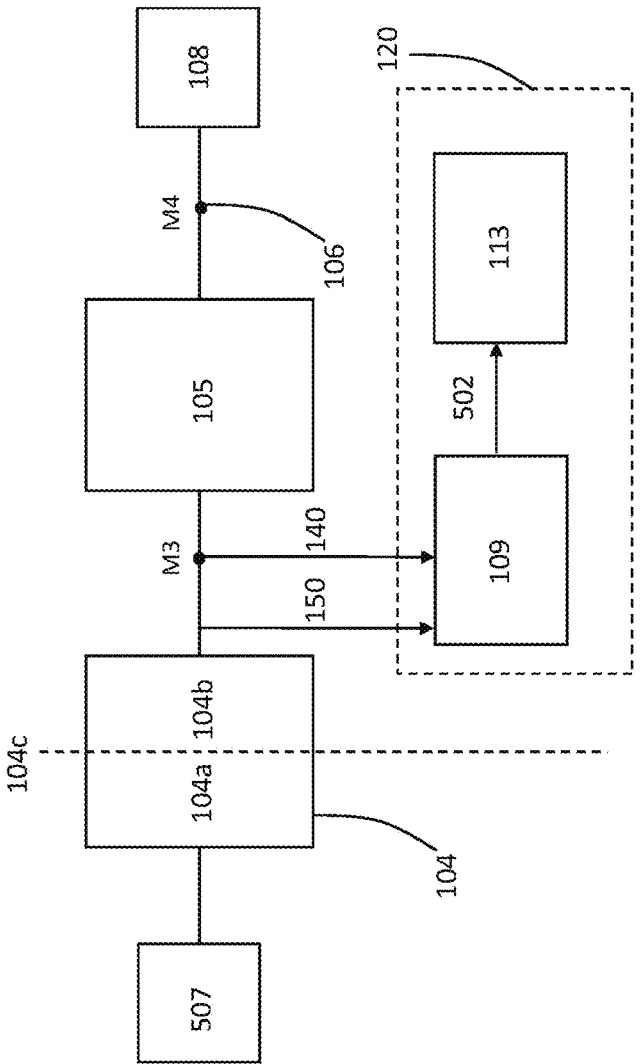
FIG. 5: Schematically illustrates a fifth embodiment of a power supply according to the invention.

FIG. 5 shows a fifth embodiment of a power supply for powering a load. The features of the power supply 500 corresponding with those of the power supply 100, 200, 300, 400 shown in FIGS. 1-4 are indicated with the same reference numerals in FIG. 5.

In FIG. 5, the external power supply 507 is a DC power supply. Therefore, there is no need for a rectifier and EMI filter. The embodiment shown in FIG. 5 is further similar to the embodiment illustrated in FIG. 1*a*.

Figure 6:
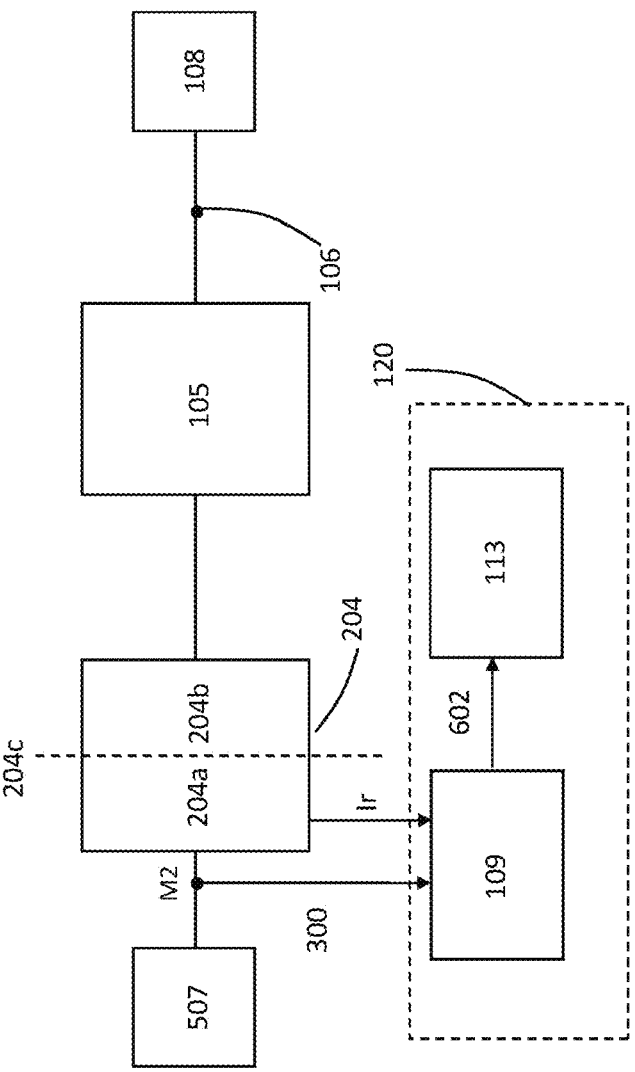
FIG. 6: Schematically illustrates a sixth embodiment of a power supply according to the invention.

FIG. 6 shows a sixth embodiment of a power supply for powering a load. The features of the power supply 600 corresponding with those of the power supply 100, 200, 300, 400, 500 shown in FIGS. 1-5 are indicated with the same reference numerals in FIG. 6.

In FIG. 6, the external power supply 507 is a DC power supply. The embodiment shown in FIG. 5 is further similar to the embodiment illustrated in FIG. 3.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

The invention claimed is:

1. A power supply for powering a load, the power supply comprising:
an input terminal configured to be connected to an external power supply having a mains voltage,
an output terminal configured to be connected to the load,
a power converter configured to convert a supply power, received from the external power supply, to a load power,
a measurement circuit configured to provide a signal representative of the mains voltage, and
a control unit configured to:
determine a voltage and a current on a load side of the power converter, and
receive the signal from the measurement circuit and to determine the mains voltage based on the signal, and
determine the load power supplied on the load side of the power converter, based on the determined voltage and current on the load side of the power converter, and
determine a loss power representing the power loss from the external power supply to the load side of the power converter, based on a loss model as a function of the determined voltage and current on the load side of the power converter and the determined mains voltage, and
determine the supply power, received from the external power supply, based on the determined load power and the determined loss power.

2. The power supply according to claim 1, wherein the power converter comprises an isolation transformer, the isolation transformer having a primary circuit connected to the input terminal and a secondary circuit connected to the output terminal, the secondary circuit being electrically isolated from the primary circuit and magnetically coupled to the primary circuit.

3. The power supply according to claim 2, wherein the measurement circuit is configured to measure the voltage and current on the secondary circuit of the isolation transformer.

4. The power supply according to claim 2, wherein the measurement circuit is configured to measure the voltage and current on the primary circuit of the isolation transformer.

5. The power supply according to claim 1, wherein the measurement circuit is configured to generate the signal representative of the mains voltage on the load side of the power converter.

6. The power supply according to claim 5, wherein the signal is based on a conduction period of current flowing through the secondary circuit when the power converter is switched from a first state to a second state.

7. The power supply according to claim 1, wherein the measurement circuit is configured to generate the signal representative of the mains voltage on a mains side of the power converter.

8. The power supply according to claim 1, wherein the loss model is an empirical loss model.

9. The power supply according to claim 1, wherein the external power supply is an AC power supply.

10. The power supply according to claim 9, wherein the power supply comprises a rectifier for rectifying the AC power supply.

11. The power supply according to claim 10, wherein the power converter comprises an EMI filter arranged downstream of the rectifier.

12. The power supply according to claim 1, wherein the power converter comprises a flyback converter.

13. The power supply according to claim 1, wherein the power converter comprises a buck or boost converter arranged downstream of the flyback or resonant converter.

14. The power supply according to claim 1, wherein the power converter comprises a resonant converter.

15. The power supply according to claim 14, wherein the power converter comprises a PFC-boost circuit arranged upstream of the resonant converter.

16. The power supply according to claim 1, wherein the measurement circuit is configured to determine an internal current associated with the resonant converter.

17. The power supply according to claim 1, wherein the measurement circuit is configured to determine an internal current associated with the PFC-boost circuit.

18. The power supply according to claim 1, wherein the external power supply is a DC power supply.

19. The power supply for powering a load, the power supply comprising:
an input terminal configured to be connected to an external power supply having a mains voltage,
an output terminal configured to be connected to the load,
a power converter configured to convert a supply power, received from the external power supply, to a load power, the power converter having an isolation transformer having a primary circuit connected to the input terminal and a secondary circuit connected to the output terminal, the secondary circuit being electrically isolated from the primary circuit and magnetically coupled to the primary circuit,
a measurement circuit configured to provide a signal representative of an internal current associated with the power converter, and
a control unit configured to:
determine one or more electrical characteristics on the primary circuit of the isolation transformer, and
receive the signal from the measurement circuit,
determine the load power supplied on the primary circuit of the isolation transformer, based on the determined one or more electrical characteristics and the internal current associated with the power converter, and
determine a loss power representing the power loss from the external power supply to a mains side of the power converter, based on a loss model as a function of the determined one or more electrical characteristics and the internal current associated with the power converter, and
determine the supply power, received from the external power supply, based on the determined load power and the determined loss power.

20. The power supply according to claim 19, wherein the one or more electrical characteristics comprise a voltage on the primary circuit of the isolation transformer.

21. The power supply according to claim 19, wherein the loss model is an empirical loss model.

22. The power supply according to claim 19, wherein the external power supply is an AC power supply.

23. The power supply according to claim 22, wherein the power supply comprises a rectifier for rectifying the AC power supply.

24. The power supply according to claim 23, wherein the power converter comprises an EMI filter arranged downstream of the rectifier.

25. The power supply according to claim 19, wherein the power converter comprises a flyback converter.

26. The power supply according to claim 25, wherein the power converter comprises a buck or boost converter arranged downstream of the flyback or resonant converter.

27. The power supply according to claim 19, wherein the power converter comprises a resonant converter.

28. The power supply according to claim 27, wherein the power converter comprises a PFC-boost circuit arranged upstream of the resonant converter.

29. The power supply according to claim 27, wherein the measurement circuit is configured to determine an internal current associated with the resonant converter.

30. The power supply according to claim 28, wherein the measurement circuit is configured to determine an internal current associated with the PFC-boost circuit.

31. The power supply according to claim 19, wherein the external power supply is a DC power supply.

32. The power supply according to claim 19, wherein the measurement circuit is configured to provide a further signal representative of the mains frequency or a quality characteristic of the external power supply to the control unit.

33. The power supply according to claim 32, wherein the control unit is configured to log and report the further signal.

34. A method for powering a load, the method comprising the steps of:
   connecting an input terminal to an external power supply having a mains voltage,
   connecting an output terminal to the load,
   converting a supply power, received from the external power supply, by a power converter to a load power,
   determining a voltage and a current on a load side of the power converter,
   providing a signal representative of the mains voltage,
   receiving the signal to determine the mains voltage,
   determining the load power supplied on the load side of the power converter, based on the determined voltage and current on the load side of the power converter,
   determining a loss power representing the power loss from the external power supply to the load side of the power converter, based on a loss model as a function of the determined voltage and current on the load side of the power converter and the determined mains voltage, and
   determining the supply power, received from the external power supply, based on the determined load power and the determined loss power.

35. The method according to claim 34, further comprising the steps of:
   connecting a primary circuit to the input terminal and
   connecting a secondary circuit to the output terminal, the secondary circuit being electrically isolated from the primary circuit and magnetically coupled to the primary circuit.

36. The method according to claim 35, wherein the step of determining the voltage and the current on the load side of the power converter comprises determining the voltage and the current on the secondary circuit.

37. The method according to claim 35, wherein the step of determining the voltage and the current on the load side of the power converter comprises determining the voltage and the current on the primary circuit.

38. The method according to claim 36, wherein the step of providing the signal comprises the measuring of a conduction period of current flowing through the secondary circuit when the power converter is switched from a first state to a second state.

39. The method according to claim 34, wherein the step of providing the signal comprises the providing of the signal representative of the mains voltage on the load side of the power converter.

40. The method according to claim 34, wherein the step of providing the signal comprises the providing of the signal representative of the mains voltage on a mains side of the power converter.

41. The method according to claim 34, further comprising the step of rectifying the external power supply.

42. Method The method according to claim 34, further comprising the step of determining an internal current associated with the power converter.

43. A method for powering a load, the method comprising the steps of:
   connecting an input terminal to an external power supply having a mains voltage,
   connecting an output terminal to the load,
   converting a supply power, received from the external power supply, by a power converter to a load power, the power converter having a primary circuit connected to the input terminal and a secondary circuit connected to the output terminal, the secondary circuit being electrically isolated from the primary circuit and magnetically coupled to the primary circuit,
   determining one or more electrical characteristics on the primary circuit,
   providing a signal representative of an internal current associated with the power converter,
   receiving the signal,
   determining the load power supplied on the primary circuit, based on the determined one or more electrical characteristics and the internal current associated with the power converter,
   determining a loss power representing the power loss from the external power supply to a mains side of the power converter, based on a loss model as a function of the determined one or more electrical characteristics and the internal current associated with the power converter, and
   determining the supply power, received from the external power supply, based on the determined load power and the determined loss power.

44. The method according to claim 43, further comprising the step of rectifying the external power supply.

45. The method according to claim 43, further comprising the step of determining an internal current associated with the power converter.

* * * * *